(12) United States Patent
Katsuyoshi et al.

(10) Patent No.: US 10,442,278 B2
(45) Date of Patent: Oct. 15, 2019

(54) SUNROOF DEVICE

(71) Applicant: AISIN WUXI BODY PARTS CO., LTD., Jiangsu (CN)

(72) Inventors: Iwashita Katsuyoshi, Jiangsu (CN); Kazuki Sawada, Jiangsu (CN)

(73) Assignee: AISIN WUXI BODY PARTS CO., LTD., Jiangsu (CN)

( * ) Notice: Subject to any disclaimer, the term of this patent is extended or adjusted under 35 U.S.C. 154(b) by 0 days.

(21) Appl. No.: 15/720,988

(22) Filed: Sep. 29, 2017

(65) Prior Publication Data

US 2018/0257465 A1  Sep. 13, 2018

(30) Foreign Application Priority Data

Mar. 13, 2017 (CN) .................... 2017 2 0239773 U

(51) Int. Cl.
*B60J 7/043* (2006.01)
*B60J 7/22* (2006.01)
*B60J 7/057* (2006.01)
*B60J 7/02* (2006.01)

(52) U.S. Cl.
CPC ............ *B60J 7/0435* (2013.01); *B60J 7/024* (2013.01); *B60J 7/057* (2013.01); *B60J 7/22* (2013.01)

(58) Field of Classification Search
USPC .............................. 296/217, 216.02–216.05
See application file for complete search history.

(56) References Cited

U.S. PATENT DOCUMENTS 9,387,749 B2 * 7/2016 Katsura ................. B60J 7/0435
2012/0248829 A1 * 10/2012 Fukami ..................... B60J 7/22
296/217
2016/0200183 A1  7/2016 Hölzel et al.

FOREIGN PATENT DOCUMENTS

| CN | 104417328 A | 3/2015 | |
| DE | 3419899 A1 * | 11/1985 | ............... B60J 7/22 |
| JP | 2014180999 A * | 9/2014 | ............... B60J 7/22 |
| JP | 2016-528105 A | 9/2016 | |

\* cited by examiner

*Primary Examiner* — Dennis H Pedder
(74) *Attorney, Agent, or Firm* — Oblon, McClelland, Maier & Neustadt, L.L.P.

(57) ABSTRACT

The present invention provides a sunroof device having a good appearance which can enlarge ventilation area on the roof and decrease the wind noise when travelling. The sunroof device comprises: a movable panel; a guide rail; a panel supporter; a drive slider; a rear link; and a shield plate comprising a shield plate body and a shield plate arm located at rear of the shield plate body in the front-rear direction of the vehicle; wherein the drive slider and the rear link are provided at rear of the shield plate arm in the front-rear direction of the vehicle; and the front end portion of the panel supporter is pivotally supported on the guide rail by a support shaft, so as to be freely movable in the front-rear direction of the vehicle, and is provided inside of the shield plate arm in the width direction of the vehicle.

3 Claims, 7 Drawing Sheets

SUNROOF DEVICE

FIELD OF THE INVENTION

The invention relatives to a sunroof device mounted on a roof of a vehicle.

DESCRIPTION OF RELATED ART

It is previously known a sunroof device, which includes: a movable panel, which can be lifted up and moved along a front-rear direction for opening and closing a part of an opening formed on a roof of a vehicle; a front link and a rear link, which could respectively cause the movable panel to move on the front side and the rear side; and a drive slider, which drives the front link and the rear link.

In the sunroof device, the front link and the rear link are lifted and moved by the drive slider, so as to lift the movable panel and move the movable panel rearward, and then cause the movable panel to slide. Thus, with the front panel and the rear link, the movable panel is kept in a fully-closed state, a ventilating state, and a fully-opened state. As a result, more elements are used, which increases the looseness amount of the elements in the fully-closed state, the ventilating state and the fully-opened state, resulting in abnormal noise of looseness.

In addition, in the sunroof device, a drive slider connected to the front link is provided on the front side, so that the mounting portion of the shield plate is disposed at a position farther from the drive slider in a width direction of the vehicle. As a result, the functional elements, such as the front link and the rear link, and the shield plate are arranged side by side with an enlarged overall width in the width direction of the vehicle, thereby the ventilation area on the roof depending on the size of the movable panel is minified. In addition, in the state that the shield plate is disposed in the inner side, the mounting portion of the shield plate is easily visible from the inner side of the vehicle, degrading the appearance. In addition, the gap from the opening of the roof to the shield plate is expanded, such that the vibration plate cannot prevent the wind noise from being generated as the traveling wind impinging onto the functional elements and a front end of glasses in an opened state.

SUMMARY OF THE INVENTION

The present invention has been made in view of the above problems, and an object of the present invention is to provide a sunroof device having a good appearance and in which the looseness amount of the functional elements in fully-closed state, ventilating state and fully-opened state, is decreased to suppress the abnormal noise of looseness, enlarge ventilation area on the roof and decrease the wind noise when travelling.

The sunroof device of the present invention comprises: a movable panel which is provided to open and close an opening formed on a roof of a vehicle; a guide rail which is provided at each edge of the opening in a width direction of the vehicle and extends in a front-rear direction of the vehicle; a panel supporter which is supported by the guide rail at a front end portion thereof in the front-rear direction of the vehicle and supports each edge of the movable panel in the width direction of the vehicle; a drive slider which is provided to be freely movable along the guide rail in the front-rear direction of the vehicle; a rear link which is engaged with the drive slider at one end and engaged with the panel supporter at another end, wherein the movable panel is opened and closed by the rear link along with movement of the chive slider in the front-rear direction of the vehicle; and a shield plate comprising: a shield plate body extending in the width direction of the vehicle; and a shield plate arm extending in the front-rear direction of the vehicle, wherein the shield plate arm is located at rear of the shield plate body in the front-rear direction of the vehicle, and the shield plate is mounted relative to the vehicle, so as to be rotatable along a shaft which is a rear end portion of the shield plate arm in the front-rear direction of the vehicle; wherein the drive slider and the rear link are provided at rear of the shield plate arm in the front-rear direction of the vehicle; and the front end portion of the panel supporter is pivotally supported on the guide rail by a support shaft, so as to be freely movable in the front-rear direction of the vehicle, and is provided inside of the shield plate arm in the width direction of the vehicle.

BRIEF DESCRIPTION OF THE DRAWINGS

FIG. 6(a) is a schematic side view showing the movable panel in the fully-closed state; and FIG. 6(b) is an enlarged view of the portion indicated by the dotted line in FIG. 6(a).

FIG. 7(a) is a schematic side view showing the movable panel in process of changing from the fully-closed state to the ventilating state; and FIG. 7(b) is an enlarged view of the portion indicated by the dotted line in FIG. 7(a).

FIG. 8(a) is a schematic side view showing the movable panel in the ventilating state; and FIG. 8(b) is an enlarged view of the portion indicated by the dotted line in FIG. 8(a).

FIG. 9(a) is a schematic side view showing the movable panel in the fully-opened state; and FIG. 9(b) is an enlarged view of the portion indicated by the dotted line in FIG. 9(a).

Figure 1:
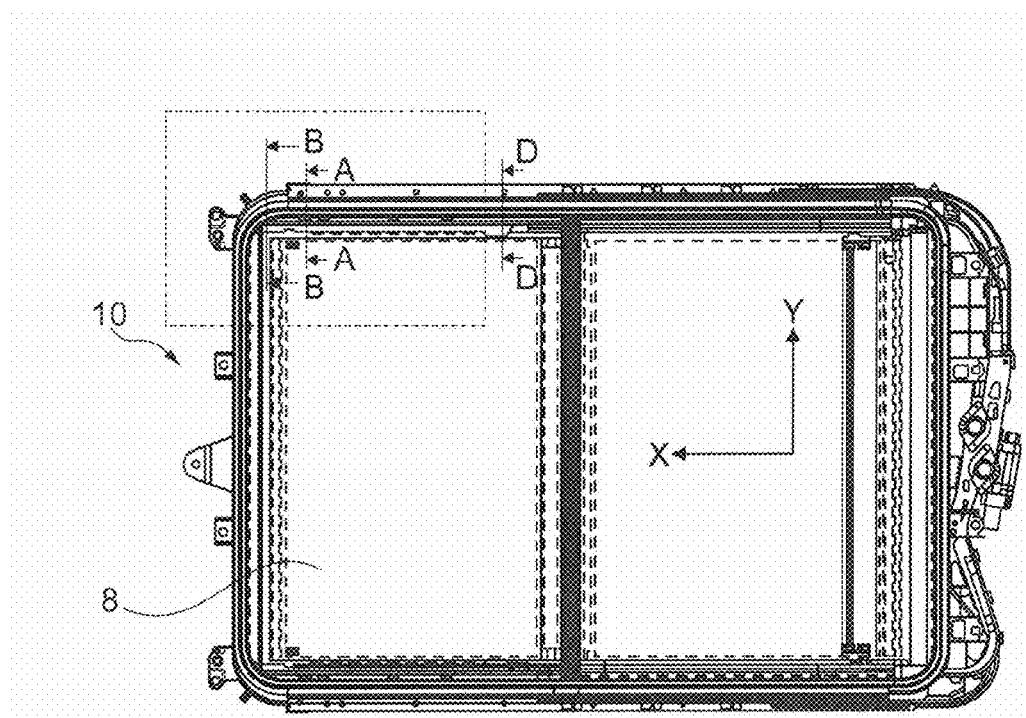
FIG. 1 is a schematic top view showing the sunroof device of the present invention.

REFERENCE SIGNS 1 shield plate
11 shield plate body
12 shield plate arm
2 drive slider
2b second limiting portion
2b1 second rear limiting slot 2*b*2 second front limiting slot
3 lateral shield plate
4 panel supporter
5 rear link
5*a* fixed-block-side limited portion
5*a*1 fixed-block-side rear pin
5*a*2 fixed-block-side front pin
5*b* drive-slider-side limited portion
5*b*1 drive-slider-side rear pin
5*b*2 drive-slider-side front pin
6 fixed block
6*a* first limiting portion
6*a*1 first rear limiting slot
6*a*2 first front limiting slot
7 guide rail
8 movable panel

EMBODIMENTS OF THE INVENTION

Preferred embodiments of the present invention will be described with reference to the accompanying drawings.

In the following drawings, a front-rear direction of the vehicle is set as X direction, and a width direction of the vehicle is set as Y direction, and an up-down direction of the vehicle is set as Z direction.

Figure 2:
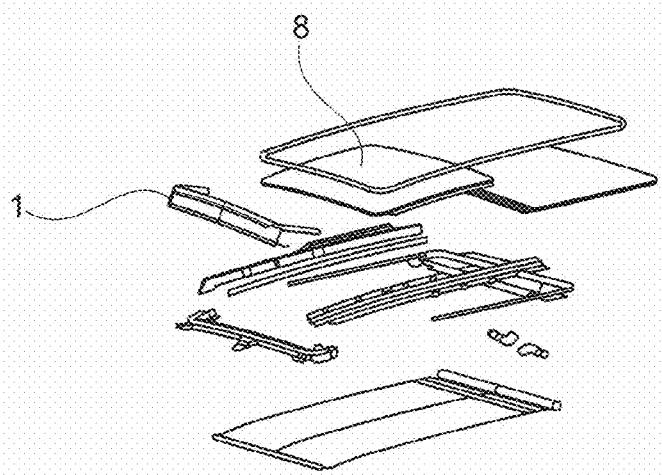
FIG. 2 is an exploded perspective view showing the sunroof device of the present invention.
Figure 3:
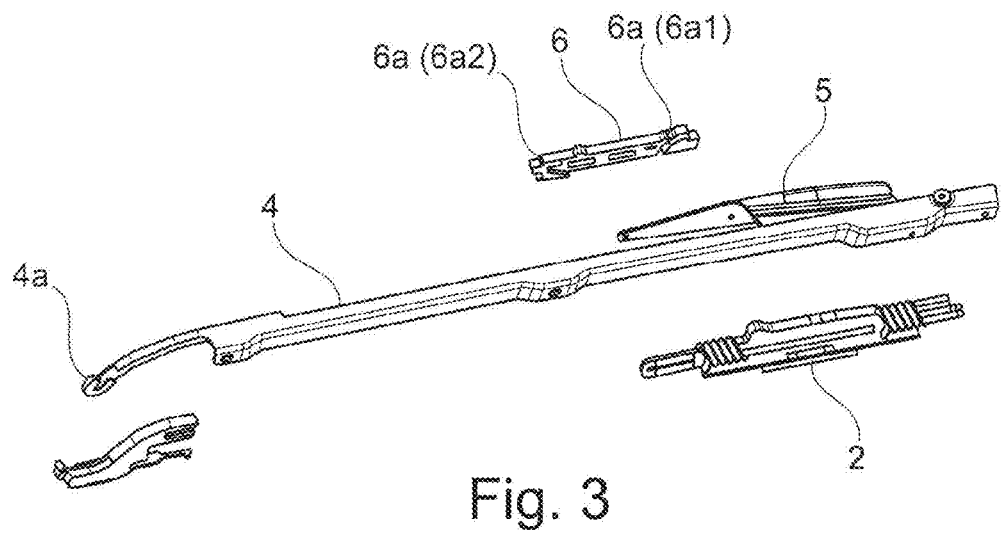
FIG. 3 is an exploded perspective view of the panel supporter, the rear link, the drive slider, and the fixed block in the sunroof device of the present invention.

FIG. 1 is a schematic top view showing the sunroof device of the present invention. FIG. 2 is an exploded perspective view showing the sunroof device of the present invention. FIG. 3 is an exploded perspective view of the panel supporter, the rear link, the drive slider, and the fixed block in the sunroof device of the present invention. As shown in FIGS. 1 to 3, the sunroof device of the present invention is mounted on the roof 10 and includes a movable panel 8 which opens and closes a substantially rectangular opening formed on the roof 10.

Figure 4:
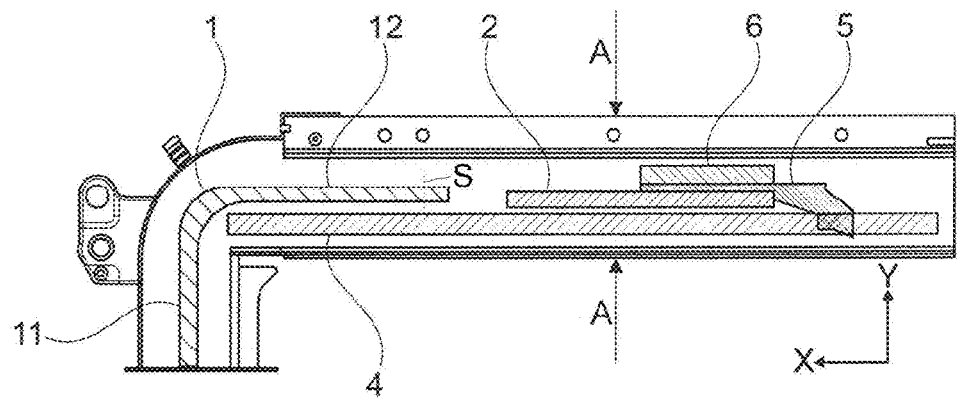
FIG. 4 is an enlarged view of the part of the sunroof device represented by the dotted line in FIG. 1 of the present invention.
Figure 5:
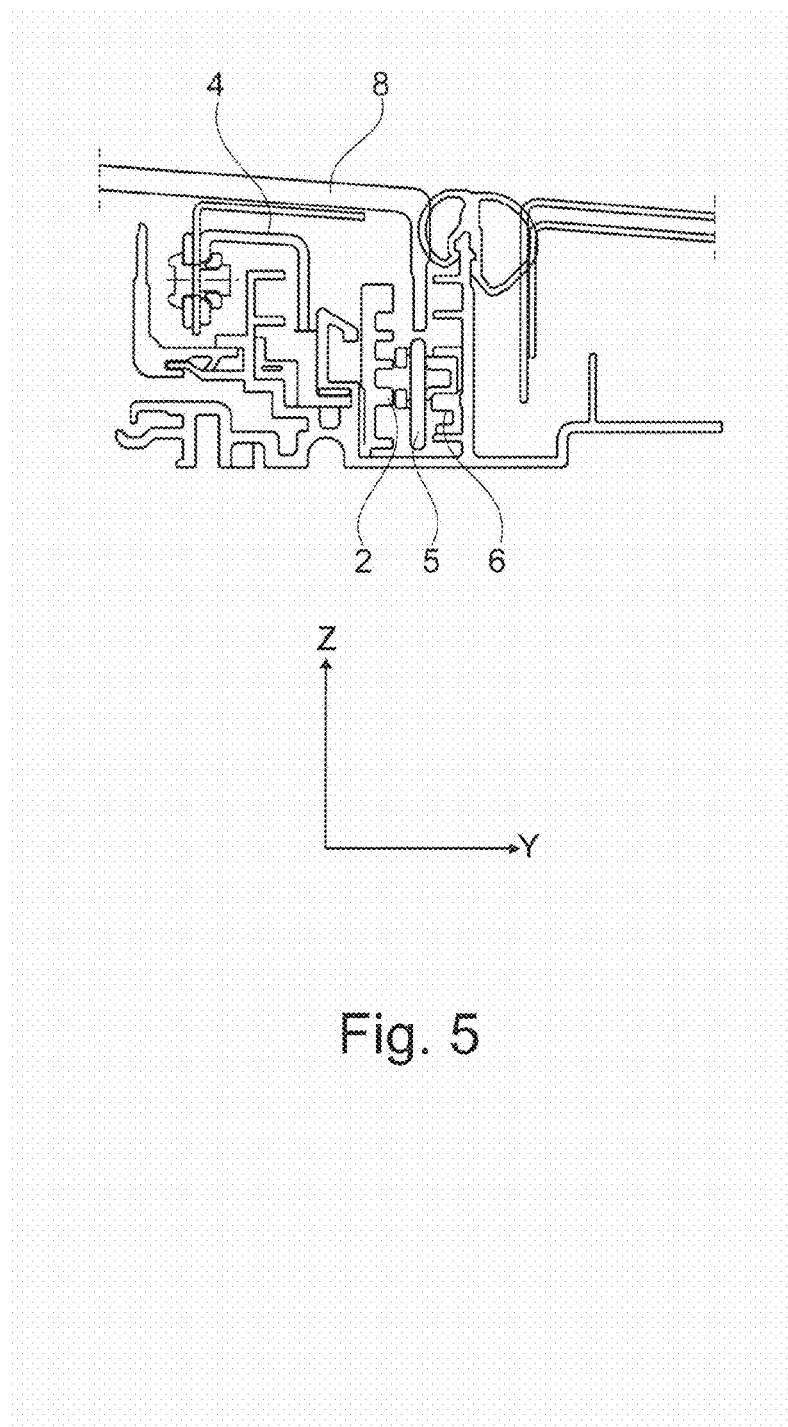
FIG. 5 is a cross-sectional view of the sunroof device of the present invention taken along line A-A in FIG. 4.

FIG. 4 is an enlarged view of the part of the sunroof device presented by the dotted line in FIG. 1 of the present invention. FIG. 5 is a cross-sectional view of the sunroof device of the present invention taken along line A-A in FIG. 4.

As shown in FIG. 4 and FIG. 5, the sunroof device of the present invention further includes a shield plate 1, drive sliders 2, panel supporters 4, rear links 5, fixed blocks 6, and guide rails 7 (not shown in FIG. 4, please refer to FIG. 9(*a*)).

Furthermore, as indicated in FIGS. 4-5 and in FIGS. 6(*a*), 6(*b*) and 9(*a*) described hereinafter, a guide rail 7 is provided at each edge of the opening in the width direction Y of the vehicle and extends in the front-rear direction X of the vehicle. The panel supporter 4 has a front end portion 4*a* in the front-rear direction X of the vehicle, and the front end portion 4*a* is supported by the guide rail 7; the panel supporter 4 supports each edge of the movable panel 8 in the width direction Y of the vehicle. The drive slider 2 is provided to be freely movable along the guide rail 7 in the front-rear X direction of the vehicle. The rear link 5 is engaged with the drive slider 2 at one end by engaging a later described drive-slider-side limited portion 5*b* with a second limiting portion 2*b*, and is engaged with the panel supporter 4 at another end, and the movable panel 8 is opened and closed by the rear link 5 along with movement of the drive slider 2 in the front-rear direction X of the vehicle.

As shown in FIG. 4, the shield plate 1 comprises: a shield plate body 11 extending in the width direction Y of the vehicle; and a shield plate arm 12 extending in the front-rear direction X of the vehicle, wherein the shield plate arm 12 is located at rear of the shield plate body 11 in the front-rear direction X of the vehicle, and the shield plate 1 is mounted relative to the vehicle, so as to be rotatable along a shaft S which is a rear end portion of the shield plate arm 12 in the front-rear direction X of the vehicle. The drive slider 2 and the rear link 5 are provided at a more rear position than the shield plate arm 12 of the shield plate 1 in the front-rear direction X of the vehicle; in other words, the drive slider 2 and the rear link 5 are provided at rear of the shield plate arm 12 in the front-rear direction X of the vehicle. Furthermore, the front end portion 4*a* of the panel supporter 4 is pivotally supported on the guide rail 7 by a support shaft (4*b* in FIG. 9(*a*)), so as to be freely movable in the front-rear direction X of the vehicle (not shown in FIG. 4, please refer to FIG. 9(*a*)), and is provided inside of the shield plate arm 12 in the width direction Y of the vehicle.

FIGS. 6(*a*) and 6(*b*) are schematic views showing the movable panel of the present invention in a fully-closed state; FIG. 6(*a*) is a schematic side view showing the movable panel in the fully-closed state; and FIG. 6(*b*) is an enlarged view of the portion indicated by the dotted line in FIG. 6(*a*).

FIGS. 7(*a*) and 7(*b*) are schematic views showing the movable panel of the sunroof device of the present invention in process of chaning from the fully-closed state to the ventilating state; FIG. 7(*a*) is a schematic side view showing the movable panel in process of chaning from the fully-closed state to the ventilating state; and FIG. 7(*b*) is an enlarged view of the portion indicated by the dotted line in FIG. 7(*a*).

FIGS. 8(*a*) and 8(*b*) are schematic views showing the movable panel of the sunroof device of the present invention in the ventilating state; FIG. 8(*a*) is a schematic side view showing the movable panel in the ventilating state; and FIG. 8(*b*) is an enlarged view of the portion indicated by the dotted line in FIG. 8(*a*).

FIGS. 9(*a*) and 9(*b*) are schematic views showing the movable panel of the sunroof device of the present invention in the fully-opened state; FIG. 9(*a*) is a schematic side view showing the movable panel in the fully-opened state; and FIG. 9(*b*) is an enlarged view of the portion indicated by the dotted line in FIG. 9(*a*).)

As shown in FIGS. 6(*a*)-9(*b*), the fixed block 6 comprises a first limiting portion 6*a*, the drive slider 2 comprises a second limiting portion 2*b*, wherein, the first limiting portion 6*a* and the second limiting portion 2*b* are both indicated by dashed lines in FIGS. 6(*a*)-9(*b*). The rear link 5 comprises a fixed-block-side limited portion 5*a* engaged with the first limiting portion 6*a* and a drive-slider-side limited portion 5*b* engaged with the second limiting portion 2*b*. Hence, the rear link 5 is engaged with the fixed block 6 by the fixed-block-side limited portion 5*a* and the first limiting portion 6*a*, and the rear link 5 is engaged with drive slider 2 by the drive-slider-side limited portion 5*b* and the second limiting portion 2*b*.

The three states of the movable panel 8, namely the fully-closed state (FIGS. 6(*a*)-6(*b*)), the ventilating state (FIGS. 8(*a*)-8(*b*)) and the fully-opened state (FIGS. 9(*a*)-9(*b*)) will be described respectively as follows.

As shown in FIGS. 6(*a*), 6(*b*) and 3 in detail, the first limiting portion 6*a* of the fixed block 6 comprises a first rear limiting slot 6*a*1 and a first front limiting slot 6*a*2 located in front of the first rear limiting slot 6*a*1, the fixed-block-side limited portion 5*a* of the rear link 5 comprises a fixed-block-side rear pin 5*a*1 engaged with the first rear limiting slot 6*a*1 and a fixed-block-side front pin 5*a*2 engaged with the first front limiting slot 6*a*2.

Similarly, as shown in FIGS. 6(*a*)-6(*b*), the second limiting portion 2*b* of the drive slider 2 comprises a second rear limiting slot 2b1 and a second front limiting slot 2b2 located in front of the second rear limiting slot 2b1, the drive-slider-side limited portion 5a of the rear link 5 comprises a drive-slider-side rear pin 5b1 engaged with the second rear limiting slot 2b1 and a drive-slider-side front pin 5b2 engaged with the second front limiting slot 2b2.

Figure 6A:
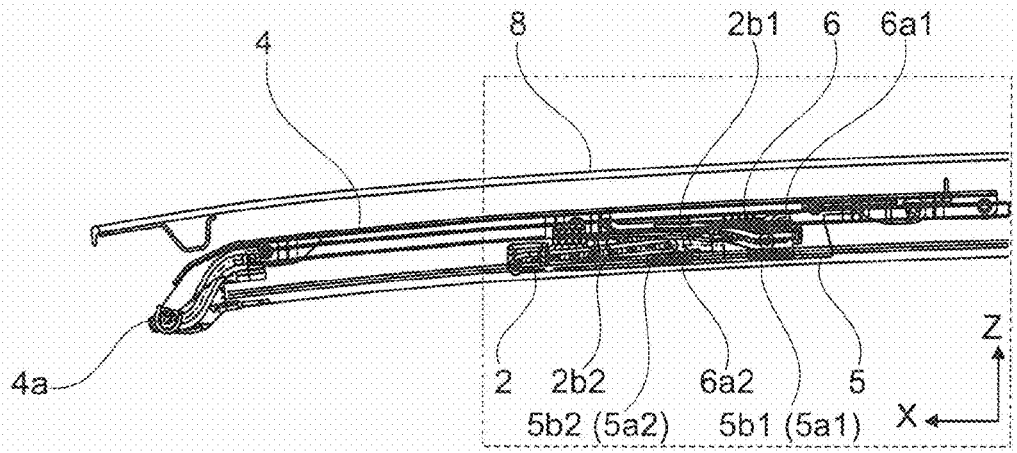
FIGS. 6(a) and 6(b) are schematic views showing the movable panel of the present invention in a fully-closed state.
Figure 6B:
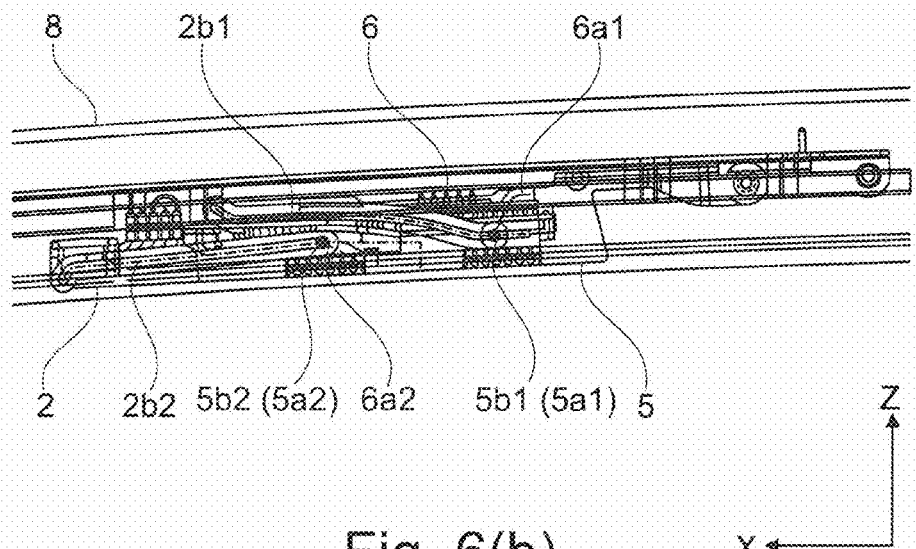

In the fully-closed state of the movable panel 8 shown in FIGS. 6(a)-6(b), the fixed-block-side rear pin 5a1 of the rear link 5 is located at a lower end of the first rear limiting slot 6a1 of the fixed block 6, i.e. the lowest point of the first rear limiting slot 6a1 in the up-down direction Z of the vehicle, while the fixed-block-side front pin 5a2 of the rear link 5 is located at an upper end of the first front limiting slot 6a2, i.e., the upmost point of the first front limiting slot 6a2 in the up-down direction Z of the vehicle.

On the contrary, the drive-slider-side rear pin 5b1 of the rear link 5 is located at a lower end of the second rear limiting slot 2b1 of the drive slider 2, i.e., the lowest point of the second rear limiting slot 2b1 in the up-down direction Z of the vehicle, while the drive-slider-side front pin 5b2 is located at an upper end of the second front limiting slot 2b2 of the drive slider 2, i.e., the upmost point of the second front limiting slot 2b2 on the up-down direction Z of the vehicle.

From above, as shown in FIGS. 6(a)-6(b), the movable panel 8 is in the fully-closed state; the fixed block 6 is capable of limiting the movement of the rear link 5 in the front-rear direction X of the vehicle by engaging the first limiting portion 6a with the fixed-block-side limited portion 5a.

Figure 7A:
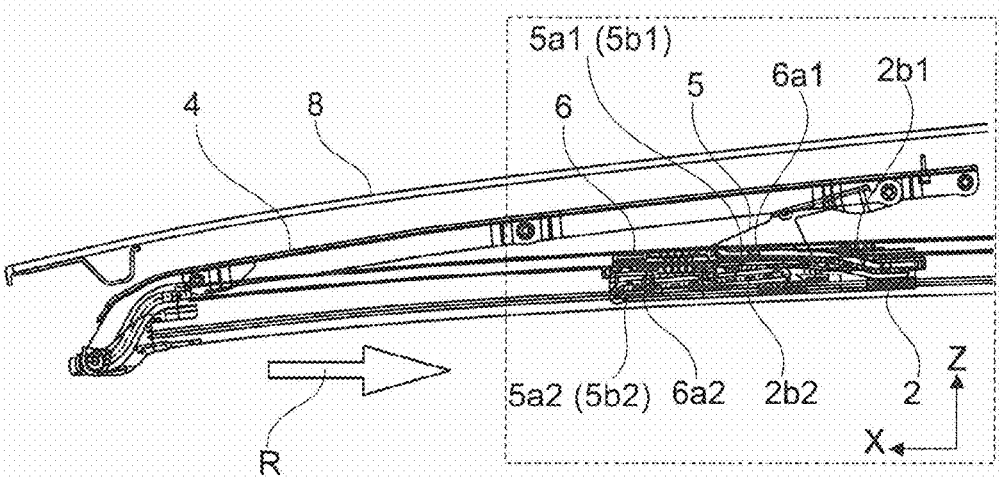
FIGS. 7(a) and 7(b) are schematic views showing the movable panel of the sunroof device of the present invention in process of changing from the fully-closed state to the ventilating state.
Figure 7B:
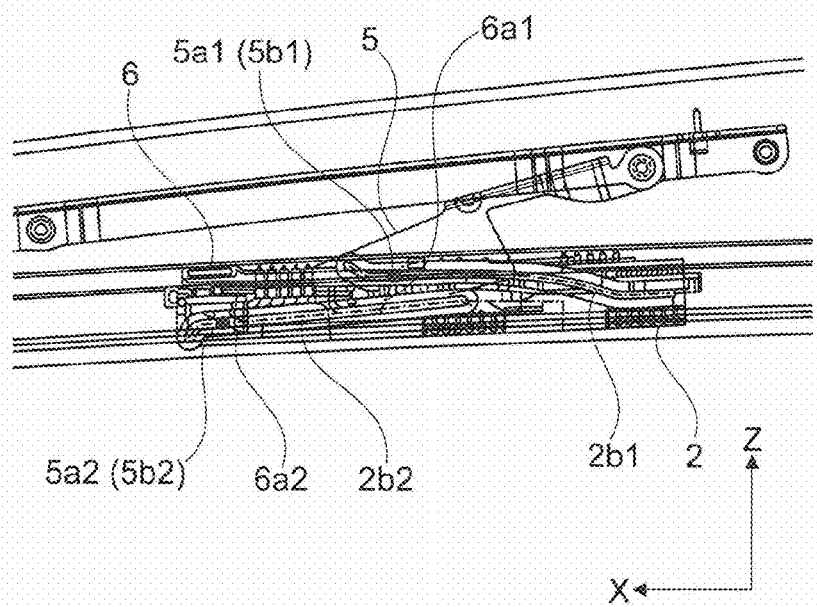

Next, as shown in FIGS. 7(a)-7(b), with the drive slider 2 moving rearward in the front-rear direction X of the vehicle, the fixed-block-side rear pin 5a1 of the rear link 5 moves upward along the first rear limiting slot 6a1 of the fixed block 6; while the fixed-block-side front pin 5a2 of the rear link 5 moves downward along the first front limiting slot 6a2 of the fixed block 6. On the contrary, the drive-slider-side rear pin 5b1 of the rear link 5 moves upward along the second rear limiting slot 2b1 of the drive slider 2; while the drive-slider-side front pin 5b2 of the rear link 5 moves downward along the second front limiting slot 2b2 of the drive slider 2.

From above, as shown in FIGS. 7(a)-7(b), the movable panel 8 is gradually opened, and the fixed block 6 is capable of limiting the movement of the rear link 5 in the front-rear direction X of the vehicle by engaging the first limiting portion 6a with the fixed-block-side limited portion 5a.

Figure 8A:
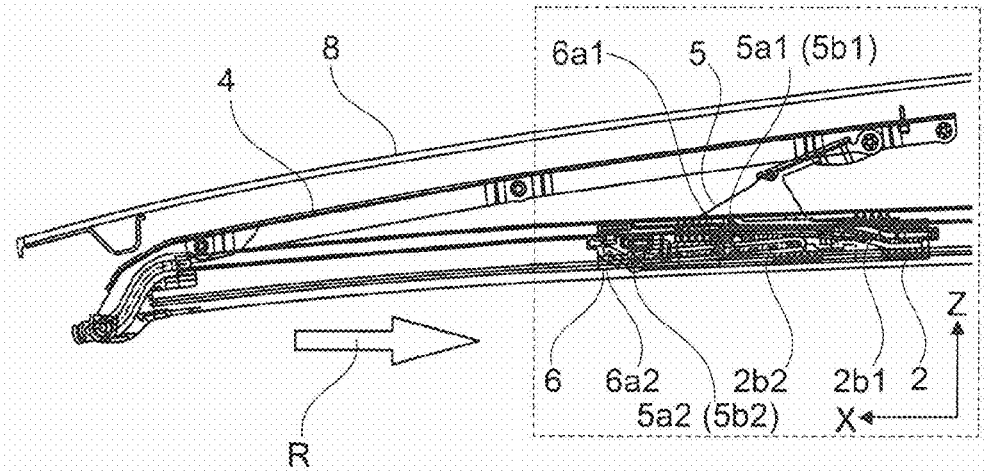
FIGS. 8(a) and 8(b) are schematic views showing the movable panel of the sunroof device of the present invention in the ventilating state.
Figure 8B:
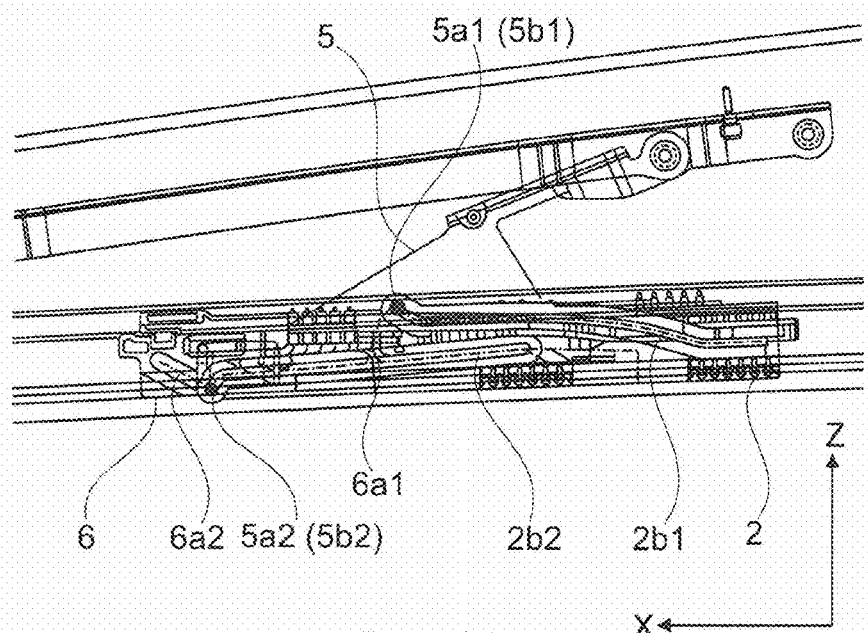

Next, as shown in FIGS. 8(a)-8(b), with the drive slider 2 moving further rearward in the front-rear direction X of the vehicle, the fixed-block-side rear pin 5a1 of the rear link 5 moves further upward along the first rear limiting slot 6a1 of the fixed block 6 and reaches a upper end of the first rear limiting slot 6a1, i.e. the upmost point of the first rear limiting slot 6a1 in the up-down direction Z of the vehicle, while the fixed-block-side front pin 5a2 of the rear link 5 moves further downward along the first front limiting slot 6a2 of the fixed block 6 and reaches a lower end of the first front limiting slot 6a2, i.e. the lowest point of the first front limiting slot 6a2 in the up-down direction Z of the vehicle. On the contrary, the drive-slider-side rear pin 5b1 of the rear link 5 moves further upward along the second rear limiting slot 2b1 and reaches a upper end of the second rear limiting slot 2b1, i.e., the upmost point of the second rear limiting slot 2b1 in the up-down direction Z of the vehicle, while the drive-slider-side front pin 5b2 of the rear link 5 moves further downward along the second front limiting slot 2b2 of the drive slider 2 and reaches a lower end of the second front limiting slot 2b2, i.e., the lowest point of the second front limiting slot 2b2 on the up-down direction Z of the vehicle.

From above, as shown in FIGS. 8(a)-8(b), the movable panel 8 is in the ventilating state and the fixed block 6 is capable of limiting the movement of the rear link 5 in the front-rear direction X of the vehicle by engaging the first limiting portion 6a with the fixed-block-side limited portion 5a.

Figure 9A:
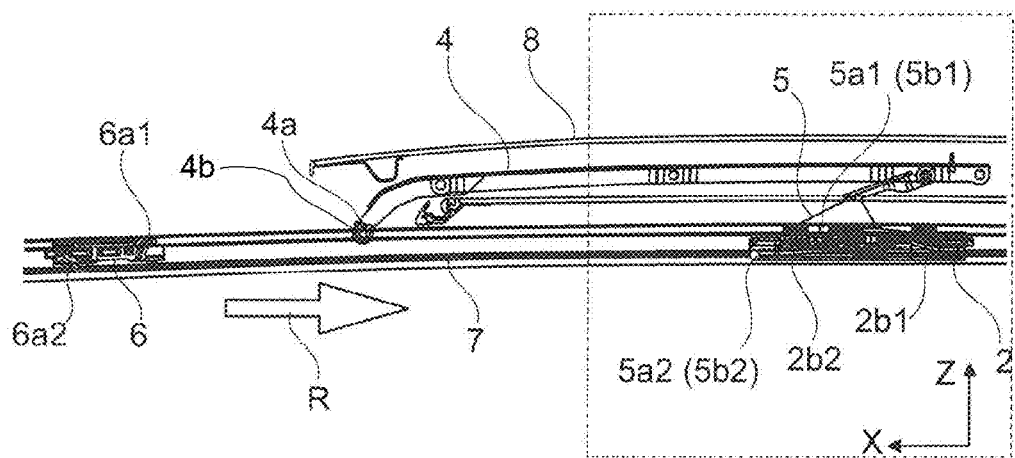
FIGS. 9(a) and 9(b) are schematic views showing the movable panel of the sunroof device of the present invention in the fully-opened state.
Figure 9B:
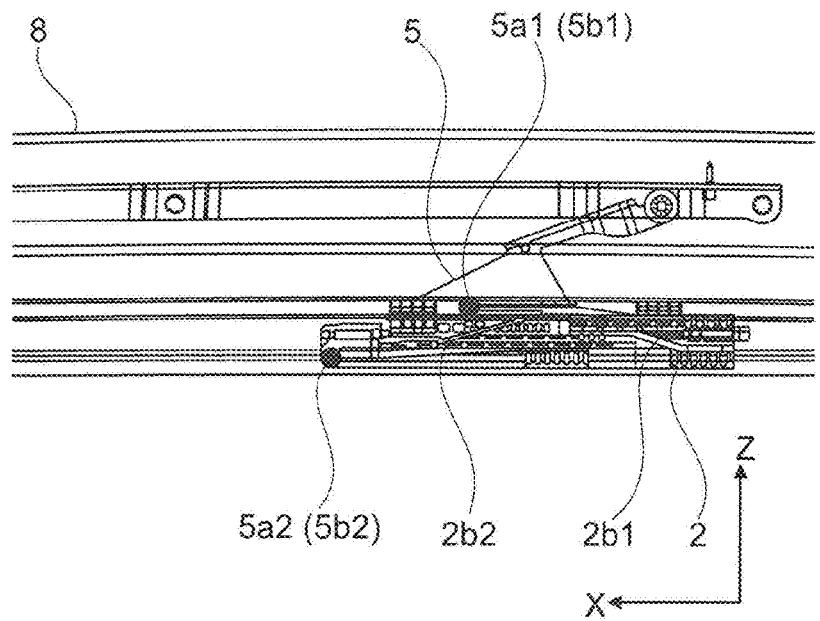

Next, as shown in FIGS. 9(a)-9(b), with the drive slider 2 moving further rearward in the front-rear direction X of the vehicle, the fixed-block-side rear pin 5a1 and the fixed-block-side front pin 5a2 of the rear link 5 is disengaged with the first rear limiting slot 6a1 and the first front limiting slot 6a2 of the fixed block 6; at that time, the drive-slider-side rear pin 5b1 and the drive-slider-side front pin 5b2 of the rear link 5 are kept engaged with the second rear limiting slot 2b1 and the second front limiting slot 2b2 of the drive slider 2, respectively, so as to pull the movable panel 8 rearward to the fully-opened state of the movable panel 8.

As described above, it is possible to limit the position of the movable panel 8 in the front-rear direction X of the vehicle by only the rear link 5 and the fixed block 6. Therefore, it is not necessary to provide the front link and the fixed block to be engaged with the front link as compared with the prior art, thereby the looseness amount of the elements is decreased to suppress the abnormal noise of looseness, and the number of elements and assembly hours are reduced.

Furthermore, in the sunroof device of the present invention, since the drive slider 2 and the rear link 5 are provided at a rear position than the shield plate arm 12 of the shield plate 1 in the front-rear direction X of the vehicle, when the movable panel 8 is opened and seen from the front, the functional elements such as the drive slider 2 and the rear link 5 are hidden at the rear of the shield plate 1, which decreases the generating of the wind noise as the travelling wind impinging onto the functional elements. Furthermore, the appearance is improved as well. In addition, since the functional elements, such as the drive slider 2 and the rear link 5, and the shield plate 2 are arranged in series in the front-rear direction X of the vehicle, the overall width may be reduced and the ventilation area on the roof 10 may be increased.

Furthermore, in the sunroof device of the present invention, the drive slider 2 is located on the inner side of the drive-slider-side limited portion 5b in the width direction Y of the vehicle; the fixed block 6 is located on the outer side of the fixed-block-side limited portion 5a in the width direction Y of the vehicle; and the support shaft (4b in FIG. 9(a)) is provided on the inner side of the width direction Y of the vehicle with respect to the drive slider 2. That is, the drive slider 2 is provided on the inner side of the rear link 5 and the panel supporter 4 is located on the inner side of the drive slider 2. Therefore, the configuration of the drive slider 2, the rear link 5, and the panel supporter 4 becomes more compact as compared with that in the prior art, contributing to miniaturize the overall configuration.

The preferred embodiment of the present invention has been described above, whereas the present invention is not limited thereto and may be appropriately deformed without departing from the scope of the present invention.

The invention claimed is:
1. A sunroof device, comprising:
a movable panel which is provided to open and close an opening formed on a roof of a vehicle;

a guide rail which is provided at edges of the opening that oppose one another in a width direction of the vehicle and extends in a front-rear direction of the vehicle;

a panel supporter which is supported by the guide rail at a front end portion thereof in the front-rear direction of the vehicle and supports edges of the movable panel that oppose another in the width direction of the vehicle;

a drive slider which is provided to be freely movable along the guide rail in the front-rear direction of the vehicle;

a rear link which is engaged with the drive slider at one end and engaged with the panel supporter at another end, the movable panel being opened and closed by the rear link along with movement of the drive slider in the front-rear direction of the vehicle; and a shield plate comprising:
  a shield plate body extending in the width direction of the vehicle; and
  two shield plate arms extending in the front-rear direction of the vehicle, wherein the shield plate arms are located rearward of the shield plate body in the front-rear direction of the vehicle, and the shield plate is mounted relative to the vehicle so as to be rotatable around an axis extending through rear end portions of the shield plate arms, and wherein the drive slider and the rear link are provided rearward of the respective shield plate arms in the front-rear direction of the vehicle, and the front end portion of the panel supporter is rotatably supported on a support shaft that is mounted on the guide rail such that the front end portion of the panel supporter is movable in the front-rear direction of the vehicle, and the front end portion of the panel supporter is arranged at the inner side relative to the respective shield plate arms in the width direction of the vehicle.

2. The sunroof device according to claim 1, wherein,
the sunroof device further comprises a fixed block having a first limiting portion;
and
the fixed block is configured to limit the movement of the rear link in the front-rear direction of the vehicle.

3. The sunroof device according to claim 2, wherein
the front end portion of the panel supporter is provided at the inner side relative to the drive slider in the width direction of the vehicle.

* * * * *